US011711033B2

(12) United States Patent
Sauzade et al.

(10) Patent No.: US 11,711,033 B2
(45) Date of Patent: Jul. 25, 2023

(54) PIEZOELECTRIC MOTOR WITH BENDING TRAVELLING WAVE (71) Applicant: TELEMAQ SAS, Grasse (FR)

(72) Inventors: Jean-Denis Sauzade, Grasse (FR); Florian Gourlay, Pugey (FR)

(73) Assignee: TELEMAQ SAS, Grasse (FR)

( * ) Notice: Subject to any disclaimer, the term of this patent is extended or adjusted under 35 U.S.C. 154(b) by 66 days.

(21) Appl. No.: 17/601,971

(22) PCT Filed: Apr. 22, 2020

(86) PCT No.: PCT/EP2020/061187
§ 371 (c)(1),
(2) Date: Oct. 7, 2021

(87) PCT Pub. No.: WO2020/224961
PCT Pub. Date: Nov. 12, 2020

(65) Prior Publication Data
US 2022/0209687 A1 Jun. 30, 2022

(30) Foreign Application Priority Data
May 6, 2019 (FR) ...................................... 1904738

(51) Int. Cl.
*H02N 2/16* (2006.01)
*H02N 2/12* (2006.01)
*H02N 2/14* (2006.01)

(52) U.S. Cl.
CPC ............. *H02N 2/163* (2013.01); *H02N 2/123* (2013.01); *H02N 2/142* (2013.01)

(58) Field of Classification Search
CPC .... H02N 2/103; H02N 2/0015; H02N 2/0055; G03B 13/36; G03B 3/10; G03B 2205/0061
See application file for complete search history.

(56) References Cited

U.S. PATENT DOCUMENTS 4,562,374 A 12/1985 Sashida
6,664,710 B1 12/2003 Gottlieb et al.
(Continued)

FOREIGN PATENT DOCUMENTS

EP 1186063 A1 3/2002
EP 1806834 A1 7/2007
(Continued)

OTHER PUBLICATIONS

Goldfarb, M., & Celanovic, N. (1997). Modeling piezoelectric stack actuators for control of micromanipulation. IEEE Control Systems Magazine, 17(3), 69-79.
(Continued)

*Primary Examiner* — Emily P Pham
(74) *Attorney, Agent, or Firm* — Nixon & Vanderhye P.C.

(57) ABSTRACT

The invention relates to a piezoelectric motor with bending travelling wave, comprising a rotary shaft (4) connected to a rotor (3), a piezoelectric element (2) attached to a vibrating stator (1), and a decoupling web (5) for attaching the vibrating stator to a mounting (7). The mounting (7) is mechanically connected to a base (9) by means of at least one deformable element (10) and at least one piezoelectric actuator (11), so that the support can be deformed angularly relative to the base in order to rotate the shaft when the vibrating stator is no longer electrically powered. The motor is particularly suitable for applications that require micrometre or nanometre accuracies, for example in positioning tools in industrial processes, precise medical robotics or optical applications.

9 Claims, 4 Drawing Sheets

(56) References Cited

U.S. PATENT DOCUMENTS

| | | |
|---|---|---|
| 9,700,917 B2 * | 7/2017 | Jeong ................ H10N 30/2048 |
| 2003/0085633 A1 | 5/2003 | Marth |
| 2006/0175930 A1 | 8/2006 | Ganor et al. |
| 2009/0009032 A1 | 1/2009 | Wischnewskij et al. |
| 2010/0034970 A1 | 2/2010 | Mochizuki et al. |
| 2011/0050035 A1 | 3/2011 | Wischnewskiy |
| 2015/0076965 A1 | 3/2015 | Culpi |

FOREIGN PATENT DOCUMENTS

| | | |
|---|---|---|
| EP | 2209203 A1 | 7/2010 |
| FR | 2740276 A1 | 4/1997 |
| FR | 3077443 A1 | 8/2019 |
| WO | WO 2006027031 | 3/2006 |

OTHER PUBLICATIONS

International Search Report dated Jul. 17, 2020 for Application No. PCT/EP2020/061187.
Pozzi, M., & King, T. (2001). Piezoelectric actuators in micropositioning. Engineering Science & Education Journal, 10(1), 31-36.
Written Opinion of the ISA dated Jul. 17, 2020 for Application No. PCT/EP2020/061187.

\* cited by examiner

PIEZOELECTRIC MOTOR WITH BENDING TRAVELLING WAVE

CROSS REFERENCE TO RELATED APPLICATIONS

The present patent application is a United States national stage application of International patent application PCT/EP2020/061187 that was filed on Apr. 22, 2020 designating the United States, and claims foreign priority to French Patent Application FR1904738 that was filed on May 6, 2019, the contents of both documents herewith incorporated by reference in their entirety.

FIELD OF THE INVENTION

The present invention relates to a piezoelectric motor operating at the resonance of a fundamental mode of its structure. It relates more particularly to a piezoelectric motor with bending traveling wave.

STATE OF THE ART

Piezoelectric motors (also called "ultrasound" or "ultrasonic" motors) are rotary or linear. They use the vibration of a structure to generate small displacements of a rotor or a cursor. Based on this principle, there are hundreds of architectures that make it possible to generate micrometric displacements. The vibrating body, called "vibrating stator" by analogy, is vibrated by piezoelectric, or electrostrictive, elements which are, generally, biased piezoelectric ceramics. More specifically, the use of piezoelectric ceramics of PZT (lead zirconate titanate) is preferred for cost or efficiency reasons. Other piezoelectric materials such as piezoelectric plastics (PVDF), quartzes or monocrystals could be used. Despite the widely diverse architecture of the piezoelectric or ultrasound motors, they are characterized only by two of energy conversion, two energy conversions: a first conversion, of electrical energy into mechanical energy (piezoelectric conversion), and a second, tribological conversion (friction drive). Schematically, the piezoelectric motors can be divided up into three categories: the motors that operate with resonance, the non-resonant (quasi-static) motors and the inertial (non-resonant) motors. The present invention relates more particularly to the motors that operate at the resonance of a fundamental mode of the structure and, more specifically, the bending traveling wave piezoelectric motors.

The bending traveling wave piezoelectric motors involve generating two bending waves in an annular vibrating stator phase-shifted in quadrature in time and in space. These standing waves phase-shifted in time ($\pi/2$) and in space (a quarter wavelength) are recombined to generate, in the annular vibrating stator, a bending traveling wave provided with a velocity of propagation. When the propagation of bending passes into a section of the annular vibrating stator, an elliptical movement is created on the surface of the vibrating stator. This elliptical movement, which is of the order of a few microns, is transformed into rotary or linear movement respectively by a rotor or a cursor pressed mechanically onto the surface of the vibrating stator. This mechanism is notably described in the patent U.S. Pat. No. 4,562,374. However, now, decades after their invention, it has to be observed that these motors have given rise to few industrial applications. The most relevant applications are those relating to camera autofocus control (Canon). Since this type of motor is based on a physical principle that is very different from the electromagnetic motor, very particular properties result from it. The main characteristics are as follows: lightweight and of little bulk (high power-weight ratio), strong torque at low speed and without gear (high accuracy), holding torque without power supply (integrated brake), no electromagnetic disturbances, silent and vibration-free, flexible design which can be incorporated at the very core of the mechanisms, high accuracy due to the absence of "pitch" (high resolution), very low mechanical response time <1 ms, wide range of operational temperatures.

These particular characteristics can be decisive for applications or small motors are demanded. This type of motor is limited in power, for example from a few tens of mW to some twenty or so watts. However, these properties may be sought for functions including locking/unlocking, adjustment, light flux control, control of optomechanical or optronics systems, of small manipulator arms, of lightweight robotics (surgical or imaging, in particular nuclear magnetic resonance), solenoid valves, mini-pumps or very accurate positioning mechanisms (hexapod, XY table, etc.). Generally, applications which require actuators that are non-magnetic or compatible with a vacuum.

However, most of these applications require increasingly demanding resolutions and positioning accuracies. The resolutions and the accuracies which are associated with these applications are on the micrometer, even the nanometer, scale. To have an idea of these requirements and of the associated applications, reference can be made to the web-site of the company Physik Instruments: www.physikinstrumente.com. Other actors like Nanomotion, Olympus, Seiko Instruments, Piezoconcept, Piezomotor, Cedrat Technologies or Noliac are active in this field. The requirements in terms of resolution and accuracy are such, for these markets, that the traveling wave piezoelectric motor becomes no longer of interest because its intrinsic resolution is inadequate. The accuracy capabilities of the traveling wave motors are based on a very short mechanical response time (of the order of 1 ms) making it possible to achieve linear accuracies at best of a few tens of microns (10 to 50 µm). This accuracy is obtained at the cost of fairly complex electronic control that allows the position of the setpoint to be anticipated. For the high-accuracy applications, none of the actors cited above uses the traveling wave piezoelectric motor technology. To obtain micrometric, and even nanometric, resolutions, the technologies used are based on the principles of standing waves, of combination of quasi-static deformations or of the movements created by inertia (stick-slip). Each of these technologies has given rise to a large number of patents, but all have a common point linked to the capacity to realize micro-steps. The inertial and quasi-static deformation (non-resonant) motors are based on electronic control at relatively low frequency and the standing wave resonant motors allow good control of the friction point at the vibrating stator/rotor (or cursor) interface.

These operating principles give them properties that are much more stable in control terms compared to those of the traveling wave motors. With regard to the standing wave motors, the patent documents from the company Physik Instruments, such as US2011/050035, WO2006/027031A1 or EP 2 209 203 A1, can be cited. Another example regarding the standing wave motors is the patent EP 1 186 063 A1. Also worthy of note is the object described in the patent U.S. Pat. No. 6,664,710 which uses two piezoelectric actuators of "stack" type to realize, in non-resonant mode, a continuous rotary movement on a shaft. The two actuators are positioned at 90° with respect to the shaft and phase-shifted in time by π/2, allowing them to generate a circular movement on a deformable part. This architecture is a variant of the linear motors with combination of quasi-static deformations (non-resonant). The drawback with this structure is its great complexity and its cost (synchronization of the stacks). Moreover, the company Cedrat Technologies has devised the possibility of using a known mode of amplification of the micronic displacements, called "flextensors", to produce elliptical displacements on the surface of the bending element. The principle is to drive a "stack" by traction and the other by compression phase-shifted in time by π/2. This architecture is described in the patent application FR2740276 A1.

Regarding the inertial motors (stick-slip), the patent documents from Physik Instruments U52015/076965 or U52010/34970 give an understanding of the principles and the advantages for micropositioning. Moreover, it is known that the use of piezoelectric actuators of "stack" or bimetallic strip type makes it possible to obtain, with certain control precautions (to compensate the hysteresis or the nonlinearity of the deformations), displacements with resolutions ranging from the nanometer to the micrometer. This control mode has been a subject of numerous scientific works and their use is common to the actors in the micropositioning field. To this end, the following scientific articles can be cited: "Modelling piezoelectric stack actuator for control of micromanipulator", M. Goldfarb, N. Celanovik, International Conference on Robotics and Automation, Minneapolis (April 1996).

"Piezoelectric actuators in micropositioning", M. Pozzi, T. King, Engineering Science and Educational Journal, Vol. 10, Issue 1, February 2001.

It should however be noted that the actuator or motor technologies that allow nanometric or micrometric resolutions and/or accuracies which have been described above have major drawbacks, some of which are briefly described hereinbelow:

The deformations and therefore the displacements generated by these structures are small (less than a micron) and therefore demand very low mechanical tolerances and very high machining and surface qualities. That is reflected by very high costs and very sophisticated technical parts.

Besides, for the inertial (stick-slip) motor, the displacements are low and the rotation speeds (for the rotary actuators) are also very low. To remedy this, complex amplification structures have been implemented, but at high cost.

The electronic control of this type of actuator is costly and bulky because signals have to be generated that make it possible to control, at each instant, the micro-"steps" of the actuators.

General Description of the Invention

To mitigate both the drawbacks of the micropositioning technologies described and the accuracy inadequacies of the traveling wave piezoelectric motors, the present invention describes a particular structure of a traveling wave motor that makes it possible to advantageously combine the benefit of traveling wave piezoelectric motors and the micrometric resolution of piezoelectric actuators. In fact, the traveling wave motors have a simple mechanical structure that does not require the stacking of complex piezoelectric ceramics or high mechanical tolerances. These are structures which operate at resonance which generate displacements of several microns (between 5 and 10 μm). Since the operating point is at a set frequency, the power supply and control electronics are fairly simple and allow miniaturization. That is reflected by manufacturing costs that are much lower than for the micropositioning-dedicated actuators. Moreover, the efficiency of these motors is very high (compared to the micropositioning actuators) which allows for continuous operation (the micropositioning actuators are reserved for adjustment applications). Also, the traveling wave motors have characteristics close to the gearless direct drive electromagnetic torque motors. The torque-speed characteristics of these motors allow for continuous rotations or significant displacements (long range) at relatively high speed.

The object of the present invention is to describe a traveling wave piezoelectric motor of relatively low cost, that is compact, that has torque-speed properties for continuous operations and a strong stopping torque without power supply and that allows nanometric resolutions and accuracies.

More specifically, the present invention relates to a bending traveling wave piezoelectric motor comprising a support positioned in a base, a piezoelectric element, a vibrating stator, a rotor, a rotary shaft and a decoupling web for securing the vibrating stator to the support. The motor according to the invention is characterized by the fact that the support is mechanically linked to the base by means of at least one deformable element and at least one piezoelectric actuator, such that the support can be deformed angularly with respect to the base, to drive the shaft in rotation when the vibrating stator is no longer electrically powered.

The present invention can be used in micropositioning applications in the field of optical devices (for example microscopy), micrometric positioning boards, hexapods, very precise liquid dispensing devices, in the medical field among others, but also in applications of robotics with force feedback, manipulators with a haptic interface, humanoid robots with instrumented articulations, ultra-accurate, non-magnetic motorizations for MRI (Magnetic Resonance Imaging) applications, surgical robots, "vacuum"-compatible motorizations, etc. This list is not exhaustive and any application demanding micropositioning actuators can be affected by the present invention.

Preferably, the piezoelectric actuator or actuators are of "stack" or bimetallic strip types and cooperate with the support. For reasons of rigidity in rotation and resolution, the actuators of "stack" type are preferred. Other types of high-resolution actuators like magnetostriction, electrostriction or capacitive deformation can be used in the context of this invention.

The piezoelectric motor according to the invention is composed of four main parts: the support, the piezoelectric element, the vibrating stator and the rotor. The piezoelectric element, preferentially an annular piezoelectric ceramic of PZT (lead zirconate titanate) type is coupled mechanically and acoustically to the vibrating stator. This coupling is preferentially made by bonding. The annular piezoelectric element is biased and powered in such a way that a bending traveling wave is generated in the vibrating stator. The excitation frequencies of this type of traveling wave piezoelectric motor depend on the geometry and the materials of the vibrating stator. Generally, a range of frequencies is defined above the human audio band, for example between 20 kHz and 50 kHz. The bending of the vibrating stator is reflected by an elliptical movement on the surface of the vibrating stator. The rotor is pressed onto the surface of the stator in order to be driven by this elliptical movement. An axial force is applied to the rotor in order for the friction force, governed by Coulomb's law, to drive the rotor. The principle of this type of traveling wave motor is described specifically by the patent U.S. Pat. No. 4,562,374 A (1985).

The friction drive of the rotor (or cursor) on the stator is a fundamental feature of the piezoelectric motors. The result thereof is that the traveling wave piezoelectric motors exhibit a stopping torque when the motor is not electrically powered. This stopping torque, characteristic of the piezoelectric motors, makes it possible to secure the support, the vibrating stator, the rotor and the shaft of the motor. The result thereof is that, when the motor is no longer powered, the support simply has to be deformed appropriately to set the shaft of the motor in motion. The position of the piezoelectric actuator or actuators, the geometry and the rigidity of the support are such that the support undergoes a slight rotation coaxial with that of the shaft of the rotor. This deformation is produced, for example gradually, as a function of the power supply voltage applied to the piezoelectric actuator. Advantageously, the rotational deformation of the support is proportional to the power supply voltage applied to the piezoelectric actuator. According to the invention, the support has preferred deformation zones, with, by cooperating with the piezoelectric actuator (or actuators) both allow a rotational movement of the support while maintaining a significant mechanical rigidity. A single piezoelectric actuator allowing the deformation of the support is sufficient for the present invention. Indeed, when the bending traveling wave motor is stopped and not powered, the shaft of the motor remains in position as long as the holding torque is not exceeded. When an electrical voltage is applied to the piezoelectric actuator, the latter deforms the support of the motor and sets the shaft in motion. These rotational displacements are small and the nanometric resolution of the piezoelectric actuator makes it possible to access angular resolutions lower than a microradian. This resolution is theoretical and will depend on technological parameters linked to the rigidities and the elasticity of the deformation zones. In addition, nonlinear phenomena, in particular hysteresis in the cycle of deformation of the actuator, affects this resolution. Moreover, a single actuator requires use in compression and in traction. It is known that the piezoelectric actuators of "stack" type have a greater force capacity in compression than in traction. It is therefore more advantageous to use two piezoelectric actuators in compression to exert a rotational deformation on the support of the traveling wave motor. To understand the entire benefit of the present invention, it is possible to simulate a position control of a bending traveling wave motor produced according to the invention. The user who wants a position control of the traveling wave piezoelectric motor alone will obtain a position of the order of an mrad (milliradian). In this case, the user will benefit from the advantages of the traveling wave piezoelectric motors such as the high rotation speed and the strong torques. When the traveling wave motor is stopped in position, another part of the driving electronics takes control of the motor by activating the piezoelectric actuator or actuators which operate within a range of ten or so mrad with a resolution of the order of a μrad (microradian). Obviously, this position control requires a position sensor capable of measuring a microradian. For the user, the benefit of the invention results in an increase by a factor of 10 of the position resolution of a bending traveling wave piezoelectric motor.

DETAILED DESCRIPTION OF THE INVENTION

The invention will be better understood will be better understood in this section, on the basis of illustrated examples. Only the elements necessary to the understanding of the invention are represented. To facilitate the reading of the drawings, the same elements bear the same references from one figure to another.

NUMERIC REFERENCES USED IN THE FIGURES

Figure 1:
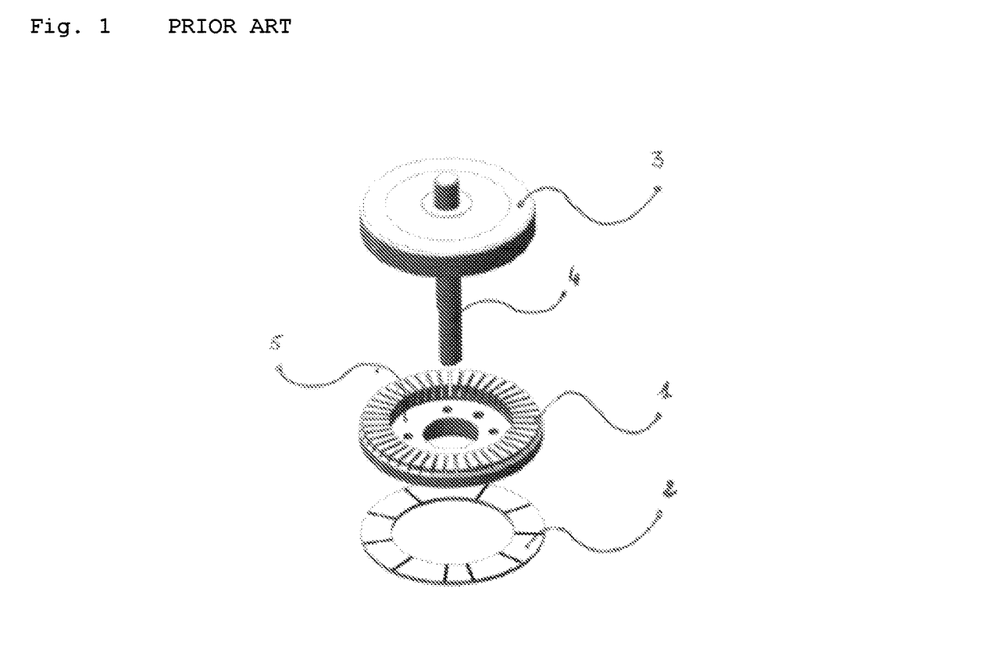
FIG. 1: Example of piezoelectric motor of the state of the art reduced to the three main elements of the motor (exploded view).

1 Vibrating stator
2 Piezoelectric element
3 Rotor
4 Rotary shaft
5 Decoupling web
6 Printed circuit
7 Support
8 Torque sensor
9 Base
10 Deformable element
11 Piezoelectric actuator
12 Mechanical amplification arrangement
13 Connection wire
14 Cap The piezoelectric motor of the state of the art illustrated in FIG. 1 is similar to that which is disclosed in the patent U.S. Pat. No. 4,562,374.

The piezoelectric electric element 2 is fixed to the vibrating stator 1. The rotor 3 is pressed mechanically onto the vibrating stator 1 by an axial force (not represented). The vibrating stator 1 comprises a fixing zone, called "decoupling web" 5, which is sufficiently rigid in rotation but sufficiently flexible axially not to disrupt the bending mode generated in the vibrating stator 1. The designation "decoupling web" well illustrates the function of this element which makes it possible to "statically" fix the vibrating stator 1 but which does not disrupt its dynamic behavior at resonance. The rotary shaft 4 is linked mechanically to the rotor 3 such that, upon the rotation thereof, the shaft 4 is set in motion with no mechanical play. In some configurations, the shaft 4 can be a hollow shaft, to allow the passage of wires or light beams for example. The piezoelectric element 2 is generally annular but can, in other embodiments, be composed of several piezoelectric ceramics suitably positioned.

Figure 2:
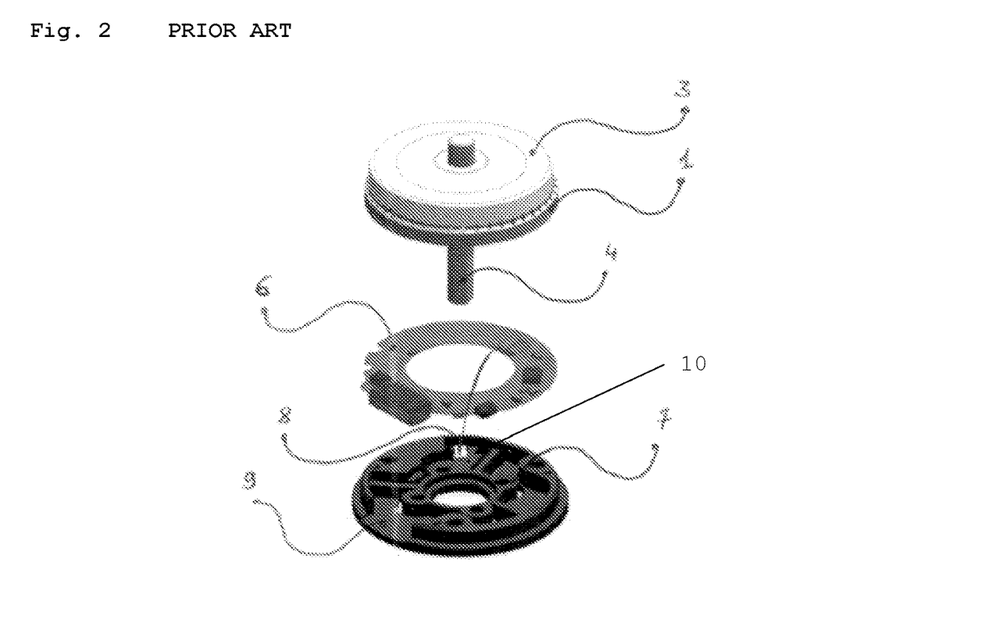
FIG. 2: Piezoelectric motor of the state of the art inserted into a support (exploded view).

The piezoelectric motor of the state of the art illustrated in FIG. 2 is fixed onto a support 7 positioned in a housing base 9. The support 7 is fixed to the housing 9 via deformable elements 10, of which at least one is provided with a torque sensor 8.

The motor also comprises a printed circuit 6 whose function is to electrically power the motor and process the signals from the various sensors incorporated in the housing (not illustrated).

It should be noted that, when the motor is stopped (without power supply), the main elements of the motor 1-4 are completely secured because they are linked in rotation by the axial force and the resultant friction force. For the rotor 3 and its shaft 4 to have a relative movement with respect to the vibrating stator 1, it is necessary to overcome the holding torque (greater than the maximum torque of the motor).

The first variant basic structure of the motor according to the invention (see FIG. 3) comprises a piezoelectric actuator 11, a support 7, two deformable elements 10, all being positioned inside the base 9 of a housing (not illustrated).

Figure 3:
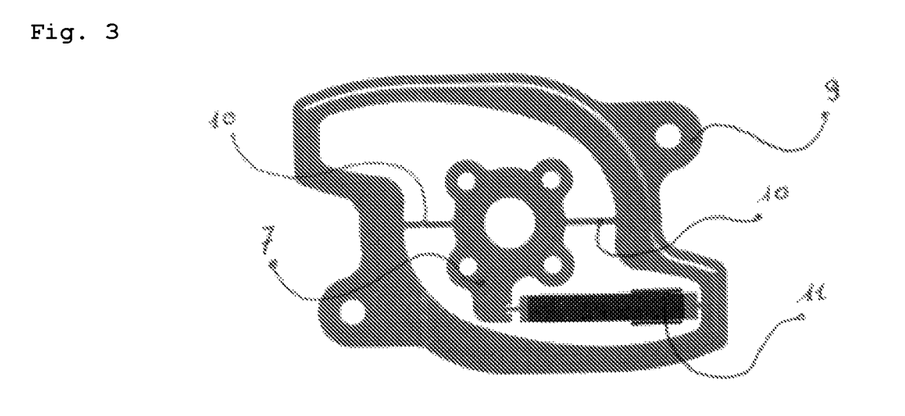
FIG. 3: First variant of a basic structure of a motor according to the invention (top view).

The piezoelectric motor according to the invention, in its variant of FIG. 3, comprises a piezoelectric actuator 11 of "stack" type. The basic structure of the motor comprises two deformable elements 10, positioned such that the longitudinal force exerted by the piezoelectric actuator 11 is translated into an angular displacement of the support 7. The angular displacement of the support 7 has the effect of setting the assembly consisting of the vibrating stator 1, the rotor 3 and the shaft 4 in rotational motion. More specifically, the vibrating stator 1 is fixed mechanically to the support 7 by means of the decoupling web 5. When the motor is stopped, the friction force between the rotor 3 and the vibrating stator 1 secure the shaft 4 and the support 7 in rotation.

Figure 4:
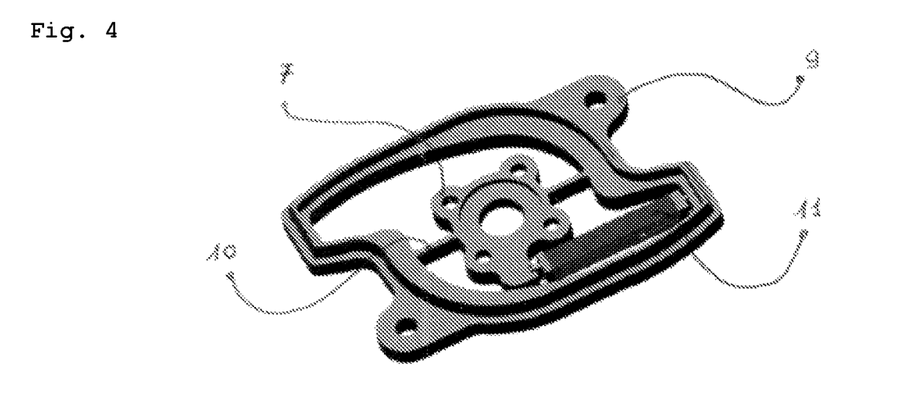
FIG. 4: Isometric view of the structure of FIG. 3.

FIG. 4 shows the mechanical links between the components 7, 9, 10, 11 which form the basic structure of the motor.

Figure 5:
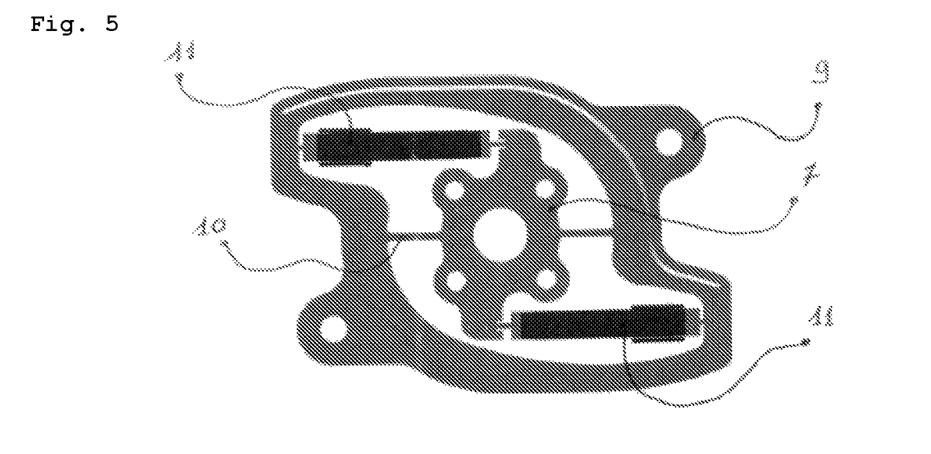
FIG. 5: Second variant of a basic structure of a motor according to the invention (top view).

The structure illustrated in FIG. 5 two piezoelectric actuators 11 positioned symmetrically on each side of the support 7.

When one of the piezoelectric actuators 11 is deformed by traction, the other piezoelectric actuator 11 is deformed by compression. The deformation force of the support 7 is ensured by the piezoelectric actuator 11 which works by compression. The structure of FIG. 5 shows an example of deformable element 10. Obviously, any other deformable element geometry that makes it possible to obtain a similar effect can be used, namely ensuring a rotational deformation of the support 7 while maintaining a high degree of mechanical rigidity in rotation. In particular, and without being exhaustive, the piezoelectric actuators 11 can be positioned perfectly symmetrically with respect to the plane in which the deformable elements 10 are situated in order for the torque of the motor (in the direction of rotation) to always exert a compression force in one or other of the piezoelectric actuators 11.

Figure 6:
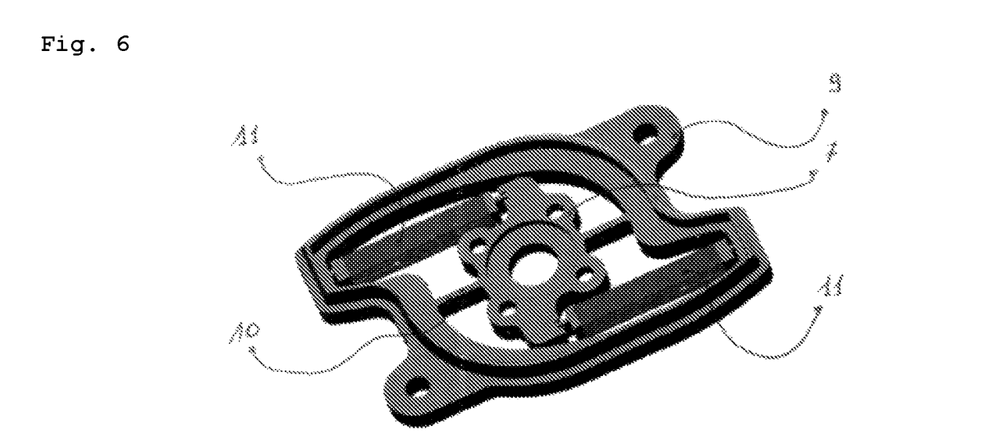
FIG. 6: Isometric view of the structure of FIG. 5.

FIG. 6 shows the mechanical links between the components 7, 9, 10, 11 which form the basic structure of the motor.

Figure 7:
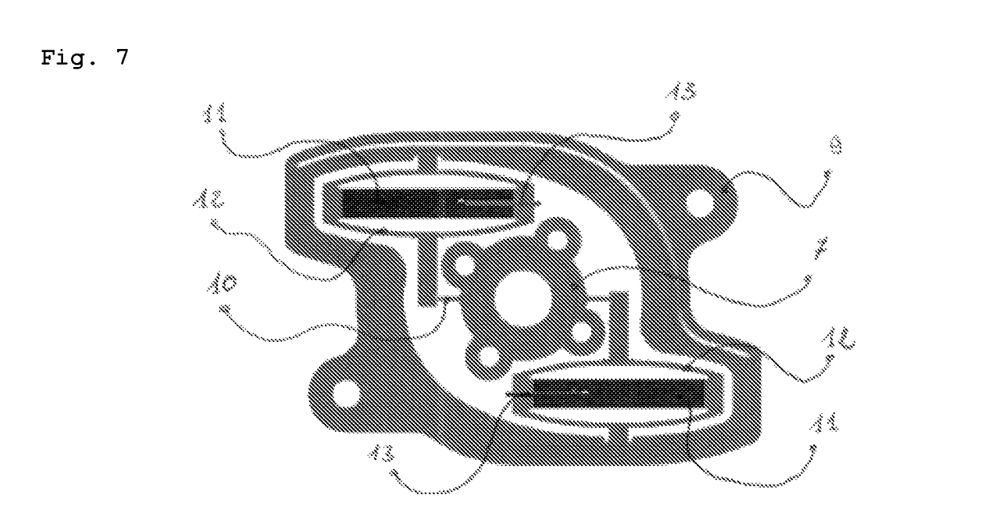
FIG. 7: Third variant of a basic structure of a motor according to the invention (top view).

In the variant structure of FIG. 7, the actuators are positioned and fixed inside mechanical amplification arrangements 12, commonly called "flextensors", which have the effect of augmenting the angle of rotation of the support 7. This amplification mechanism is known but the present invention also includes any other type of mechanical amplification mechanism, more particularly those that use "pivot" points and elastic deformations.

Figure 8:
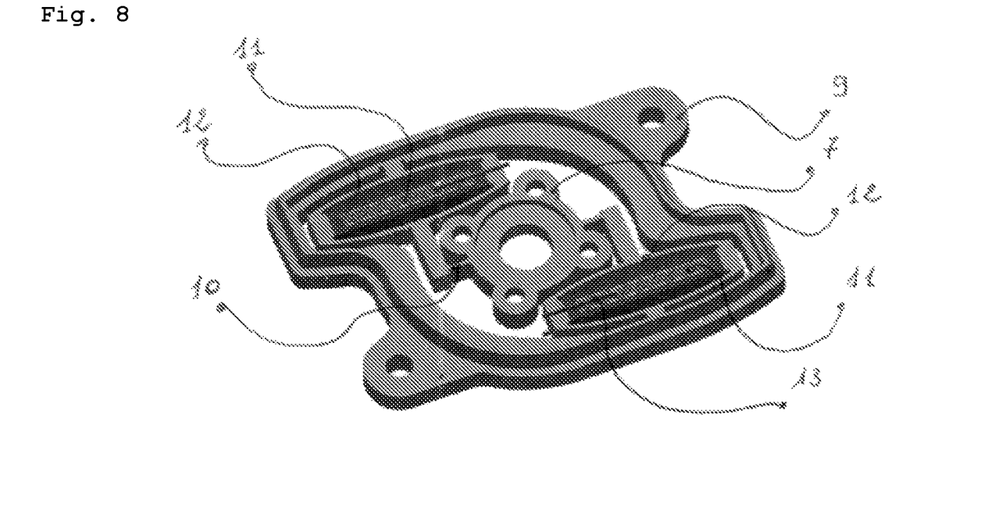
FIG. 8: Isometric view of the structure of FIG. 7.

FIG. 8 shows the mechanical links between the components 7, 9, 10, 11, 12 which form the basic structure of the motor.

The variant of FIG. 8 shows electrodes and the connection wires 13 that make it possible to electrically power the piezoelectric actuators 11. In the nanometric or micrometric positioning applications, it is necessary to be able to control these displacements by sensors. Several techniques are known to the person skilled in the art, in particular the extensiometry gauges positioned either directly on the "stack" (and measuring the elongation of the actuator) or in combination with a deformation element as defined, for example by the deformable elements (and measuring the deformation of these elements). It should be noted that the same deformation sensors that make it possible to control the high-resolution angular displacements due to the piezoelectric actuators can be used to measure the resisting torque of the motor. By using either the control electronics of the traveling wave piezoelectric motor, or the control electronics of the piezoelectric actuators, the field of application of the sensors can be dissociated while exploiting the same output values. Other types of sensors able to measure very small deformations or displacements can be implemented according to the state of the art and in accordance with the knowledge of the person skilled in the art. Capacitive, piezoresistive, optical or Hall-effect sensors can notably be used.

Figure 9:
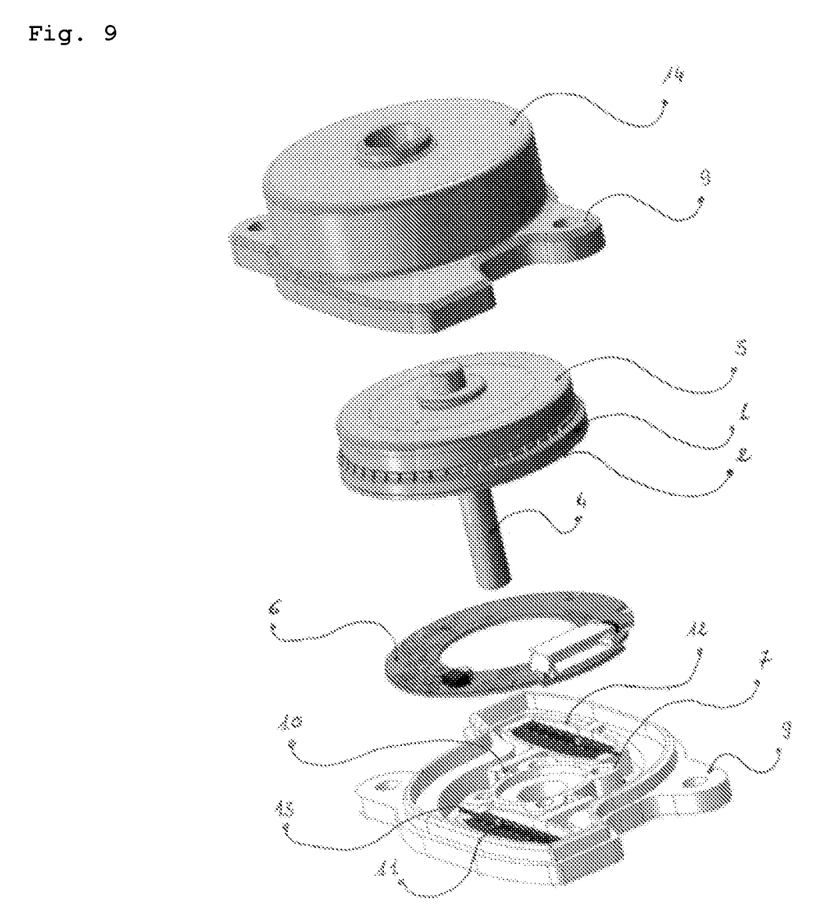
FIG. 9: Example of construction of a motor according to the invention.

Finally, FIG. 9 presents a piezoelectric motor according to the invention, associated with the structure illustrated in FIGS. 7 and 8.

The base 9 of the housing and the cap 14 make it possible to exert the axial force necessary to press the rotor 3 onto the vibrating stator 1. This axial force is relayed by a ball bearing (not represented). The angular movement induced by the piezoelectric actuators 11 drives all of the basic structure of the motor and the shaft 4. The motor according to the invention preferably comprises a two-level power supply and control electronic circuit board (not represented). The first level consists of the electronic elements that make it possible to generate the electric power supply signals of the traveling wave motor, in particular two electrical waves lying between 20 and 60 kHz, phase-shifted by $\pi/2$, and with a voltage of between 20 and 200 V, depending on the characteristics of the motors. When the motor is stopped, the second level has electronic components whose role is to supply DC (or low-frequency) current to the piezoelectric actuators appropriately.

As indicated previously, the motor according to the present invention entails the use of at least one piezoelectric actuator 11 operating either by compression or by traction (sufficient condition). An actuator of bimetallic strip type operating by bending can be implemented. This type of actuator is characterized by greater displacement, which facilitates the mechanical integration but the forces are much lower. In the micrometric positioning applications, it is important to maintain a high degree of rigidity in rotation. That is why the actuators of "stack" type will be preferred in this field of use. Being much more rigid, they are capable of generating significant forces but, on the other hand, low displacements of the order of 50 to 100 μm of travel. The piezoelectric actuator of "stack" type 11 has the advantage of maintaining on the support 7 a high degree of rigidity in rotation. Such an actuator can be driven by DC (positive or negative) voltages of a few volts which makes the power supply electronics much more simple. However, this type of actuator is sensitive to the tensile stress leading the "stack" to break or be damaged. To mitigate this effect, the "stack" should be mechanically prestressed or be made to operate only by compression. For that reason, and for other reasons linked to the symmetry of the mode of actuation of the actuators with respect to the axis of rotation, it is advantageous to have two piezoelectric actuators 11 to rotationally deform the support 7.

If it is wanted to increase the angular travel in the displacement of the support 7, it is sufficient to amplify the displacement of the piezoelectric actuator or actuators 11.

The piezoelectric motor according to the invention can advantageously be used for very diverse micropositioning operations, in relation for example to optronics components, manipulators with force feedback (haptic interface), robotic arms for any industrial or medical application, high-precision process tooling (semiconductors), hexapods, active vibration control, fluid minipumps, solenoid valves, actuators compatible with applications in a vacuum, in high magnetic fields or for controlling optical paths.

It goes without saying that the invention is not limited to the examples illustrated.

The invention claimed is:

1. A bending traveling wave piezoelectric motor comprising:
   a base;
   a support;
   a piezoelectric element;
   a vibrating stator;
   a rotor;
   a rotary drive axis; and
   a decoupling web for fixing of the vibrating stator to the support,
   wherein the support is mechanically connected to the base via a deformable element and a first piezoelectric actuator, such that the support can be angularly displaced relative to the base to rotate the rotary drive axis when the vibrating stator is no longer supplied by electricity.

2. The bending traveling wave piezoelectric motor according to claim 1, further comprising:
   a second piezoelectric actuator configured to operate in flexion, mechanically connecting the support to the base,
   wherein the first piezoelectric actuator is configured to operate in compression.

3. The bending traveling wave piezoelectric motor according to claim 1, wherein the first piezoelectric actuator is configured as a stack.

4. The bending traveling wave piezoelectric motor according to claim 1, further comprising: a piezoelectric mechanical amplification arrangement configured to increase an angular displacement of the support relative to the base.

5. The bending traveling wave piezoelectric motor according to claim 1, wherein the piezoelectric actuator includes a displacement sensor.

6. The bending traveling wave piezoelectric motor according to claim 4, wherein the piezoelectric mechanical amplification arrangement includes a displacement sensor.

7. The bending traveling wave piezoelectric motor according to claim 6, wherein the displacement sensor is used to measure a resisting torque of the bending traveling wave piezoelectric motor during operation.

8. The bending traveling wave piezoelectric motor according to claim 1, wherein the rotary drive axis is hollow.

9. The bending traveling wave piezoelectric motor according to claim 1, further comprising: an electronic supply and control device with two stages including a first stage dedicated to the bending traveling wave piezoelectric motor and a second stage dedicated to the first piezoelectric actuator.

* * * * *